Feb. 20, 1934.  F. C. MEYER  1,947,481
CABLE JOINT
Filed Sept. 2, 1932  2 Sheets-Sheet 1
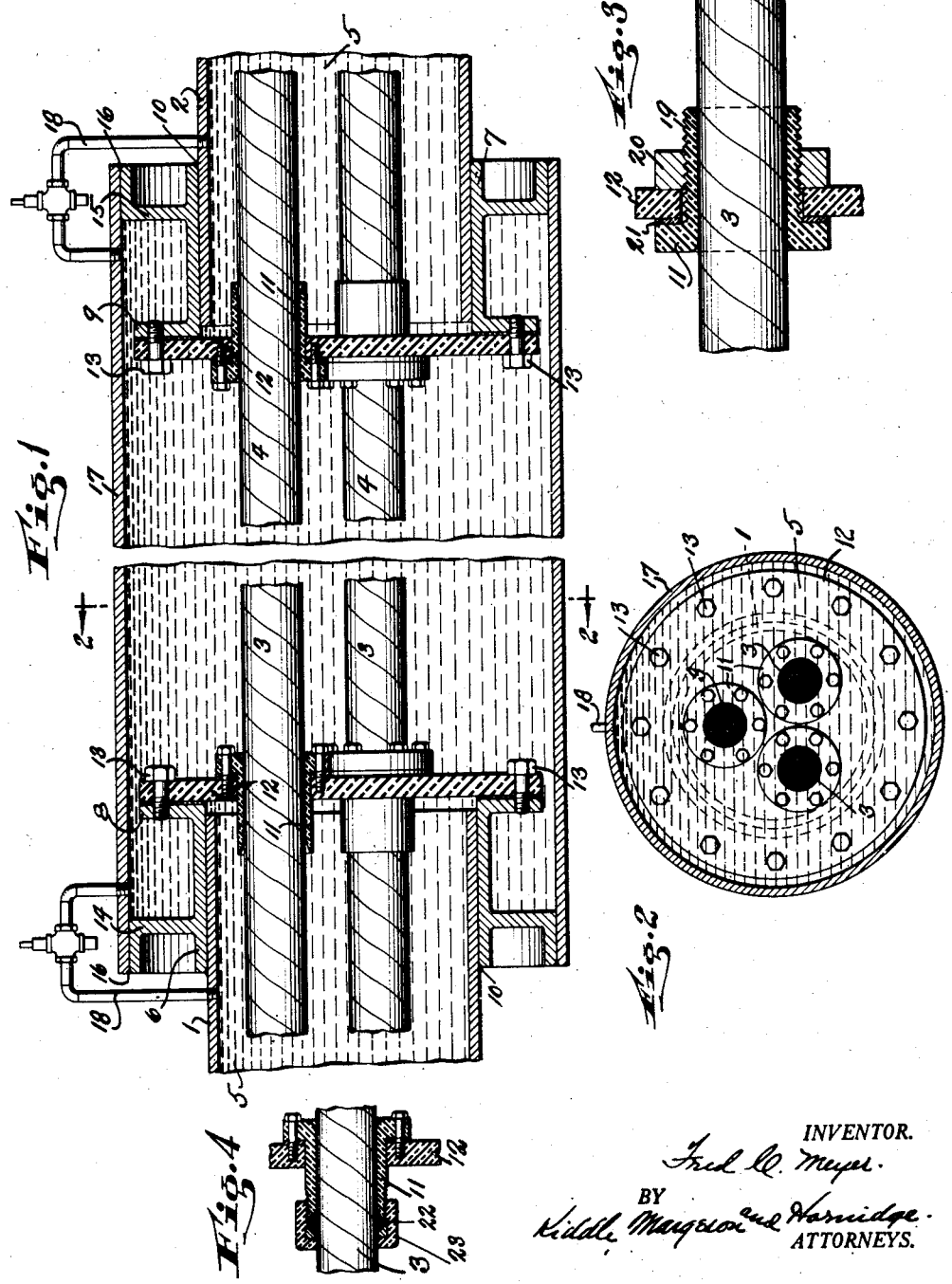
INVENTOR.
Fred C. Meyer.
BY
ATTORNEYS.

Feb. 20, 1934.    F. C. MEYER    1,947,481
CABLE JOINT
Filed Sept. 2, 1932    2 Sheets-Sheet 2
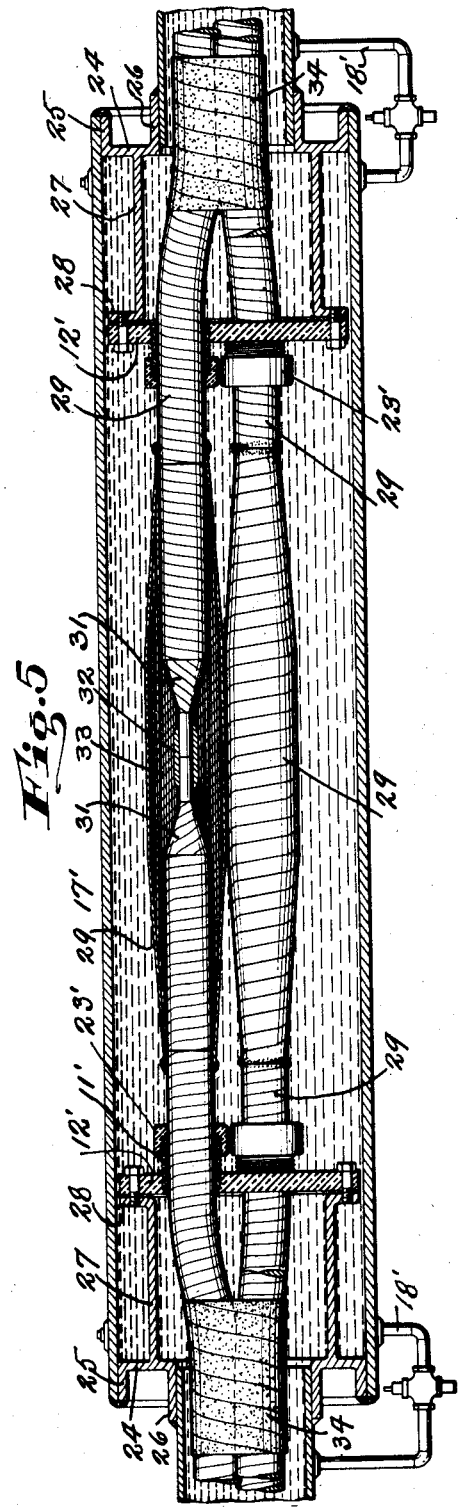
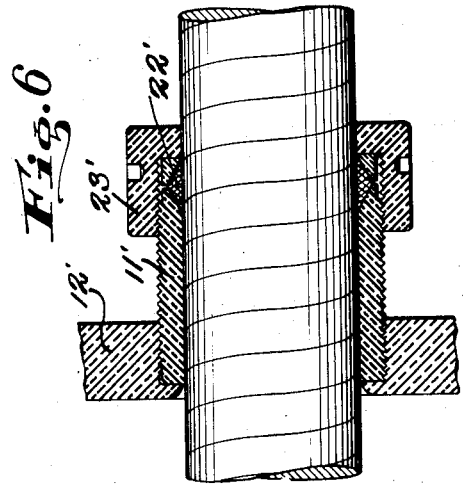
INVENTOR.
Fred C. Meyer.
BY
ATTORNEYS.

Patented Feb. 20, 1934

1,947,481

UNITED STATES PATENT OFFICE 1,947,481

CABLE JOINT

Fred C. Meyer, Paterson, N. J., assignor to The Okonite-Callender Cable Company, Incorporated, Paterson, N. J., a corporation of New Jersey Application September 2, 1932. Serial No. 631,485

5 Claims. (Cl. 173—268)

This invention relates to a joint for electric cables and is particularly well adapted for cables of that type in which the unsheathed cable is loosely enveloped by or lies in a steel or other metal pipe filled with oil under pressure such as disclosed in Charles E. Bennet application Serial No. 553,714, filed July 29, 1931.

In the drawings accompanying this application:

Fig. 1 is a sectional elevational view of my improved joint;

Fig. 2 is a section on the line 2—2 of Fig. 1;

Fig. 3 is a slightly modified form of joint; and

Figs. 4, 5 and 6 are further modifications.

For purposes of illustration I have shown my joint in connection with a three conductor cable.

Referring to the drawings in detail and particularly first of all to Figs. 1 and 2, the cables 3 and 4 are laid in steel or other suitable metal pipes 1 and 2, these pipes as will be understood being filled with oil or other suitable insulating fluid designated 5 and maintained under pressure.

On the adjacent ends of the pipes 1 and 2 are sleeves 6 and 7, the inner end of the sleeve 6 being provided with an outwardly extending flange 8, the inner end of the sleeve 7 with an outwardly extending flange 9. These sleeves are welded as shown at 10 to the pipes 1 and 2, respectively.

Immediately about each cable is a snug fitting thimble 11 of bakelite, for instance, passing through a rigid barrier plate 12, which may be non-ferrous metal, bakelite or other suitable material, the head of each thimble being bolted to the barrier plate, while one of the barrier plates is bolted or otherwise rigidly secured to the flange 8 on the sleeve 6, and the other to the flange 9 on sleeve 7 by bolts 13.

It is to be understood that metal may be employed for the thimbles 11 when the conductors are shielded.

The thimbles are a drive fit on the cables, and together with the plates 12 present a barrier to the passage of oil from the pipes 1 and 2 into the joint. As will be seen from the drawings, particularly from Fig. 1, the end of the bores of each of the thimbles 11 is flared slightly to facilitate application of the thimbles to the cable.

The sleeve 6 is provided with a flange 14 and sleeve 7 with flange 15 and welded or otherwise rigidly secured as shown at 16 to each of these flanges is a joint sleeve or enclosing casing 17, the weld or other connection being liquid tight.

Pipes 18 maintain communication between the interior of the pipes 1 and 2 and the interior of the joint and can be used for the control of the flow of the liquid insulating material.

In Fig. 3 wherein a modified form of construction is shown the thimbles 11 are threaded externally as shown at 19 and the barrier plate 12 instead of being bolted thereto as in the construction shown in Figs. 1 and 2 is held in place by nut 20, which jams the plate 12 against packing 21, between the plate and the thimble 11.

In Fig. 4 a further modified construction is shown in which each of the thimbles 11 is provided with packing 22 and packing gland 23.

Referring to Figs. 5 and 6, 12' designates barrier plates for the cables, these plates being equipped with thimbles 11' for receiving the conductors to be joined, the thimbles being screwed into the barrier plates as shown in Fig. 6. The thimbles are provided with screw rings or glands 23', packing 22' being provided for sealing.

The casing 17' of the joint has end cap rings 24 with flanges 25 and 26, the latter being welded to the pipes 1 and 2 in which the cables are laid, as above referred to. The flanges 25 are welded to the casing 17'.

The main portion of each of the end cap rings 24 is provided with a cylindrical inwardly extending portion 27 which at its inner end is flanged as shown at 28 and the barrier plates are bolted to these flanges. The interior of the joint is maintained in communication with the interior of the pipes 1 and 2 by the connection 18 as in the embodiment of the invention in Fig. 1.

Each of the conductors is paper insulated and on the outside of this paper is wrapped a metal tape or a metal braid or metallized paper designated 29. This tape is unwrapped from the paper, the conductor pencilled as shown at 31, the two ends of the conductors united by a connector 32 and then paper or varnished cambric is wound about the splice as shown at 33 in Fig. 5, and finally the wrapping of metal tape 29 is continued over the splice thus made as also shown in Fig. 5.

To protect the insulation of the conductors in the welding operation when buiding up the joint asbestos or other suitable heat insulating material designated 34 is wrapped about the conductors.

What I claim is:—

1. A joint for electric cables comprising in combination oil filled pipes, cables to be joined in said pipes, a thimble for receiving each cable in each pipe, a sleeve on the adjacent ends of said pipes and having a liquid tight joint thereto, and a barrier plate rigidly secured to each of said thimbles and said sleeves.

2. A joint for electric cables comprising in combination oil filled pipes, cables to be joined in said pipes, thimbles receiving said cables, a barrier plate rigidly secured to each thimble, a sleeve surrounding and rigidly secured to adjacent ends of said pipe, an outer sleeve rigidly uniting said first mentioned sleeves, and pipes establishing communication between each of said pipes and the interior of the joint.

3. A joint for electric cables comprising in combination oil filled pipes, cables to be joined in said pipes, a thimble applied to each cable, a barrier plate adjacent the end of each of said pipes, said barrier plates receiving said thimbles, said thimbles being rigidly attached thereto, a sleeve on the outside of the adjacent ends of said pipes and rigidly secured thereto, a rigid connection between the barrier plates and said sleeves, an outer sleeve rigidly uniting said first mentioned sleeves and having a liquid tight connection thereto, and conduits for establishing communication between the interior of the joint and each of said pipes.

4. A joint for electric cables of the pressure type, comprising in combination oil filled pipes, cables to be joined in said pipes, a thimble of insulating material applied directly to the insulation of each cable, a barrier plate of insulating material adjacent the end of each of said pipes, said barrier plates receiving said thimbles and the thimbles being rigidly attached thereto, a sleeve on the outside of the adjacent ends of said pipes and rigidly secured thereto, a rigid connection between the barrier plates and said sleeves, an outer sleeve rigidly uniting said first mentioned sleeves and having a liquid tight connection thereto, and conduits for maintaining communication between the interior of the joint and each of said pipes.

5. A semi-stop joint for high tension electric cables of the type in which the insulated cable conductors are laid in a pipe filled with oil maintained under high pressure in which the conductors and their insulation are submerged, said joint comprising in combination an enclosing casing secured liquid-tight to the cable pipes, barrier plates within the casing, each plate being provided with a liquid-tight extension secured liquid-tight to the cable pipes, thimbles carried by said barrier plates for receiving and supporting the insulated cable conductors which are to be joined within said casing, said thimbles having a drive fit on the insulation of the cable conductors to prevent the flow of oil from the cable pipe to the casing exterior to the insulation of the cable conductors while permitting of the slow seepage of oil through the insulation of the cable conductors from one side of the barrier plate to the other.

FRED C. MEYER.